(No Model.)
L. M. COTTLE.
VELOCIPEDE.
No. 463,329. Patented Nov. 17, 1891.
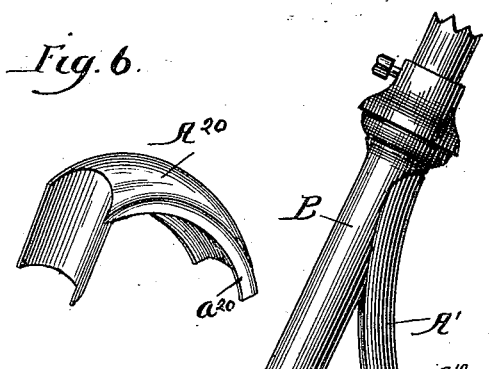
Fig. 6.
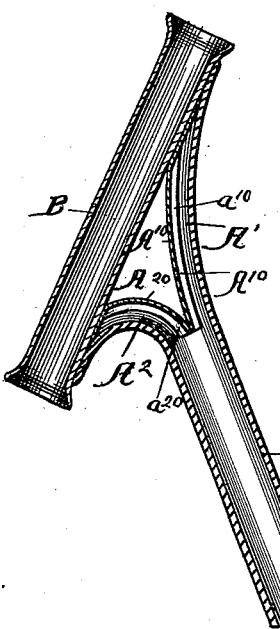
Fig. 2.
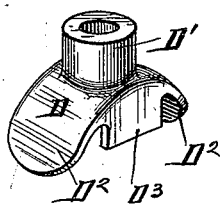
Fig. 5.
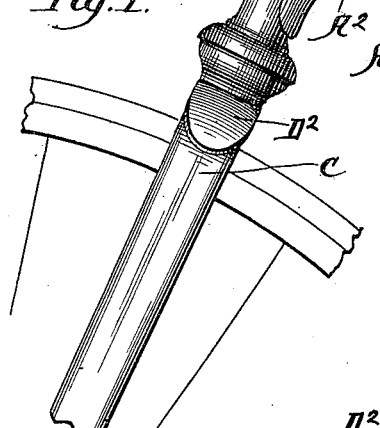
Fig. 1.
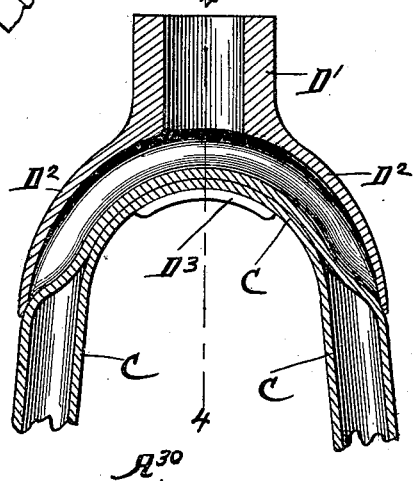
Fig. 3.
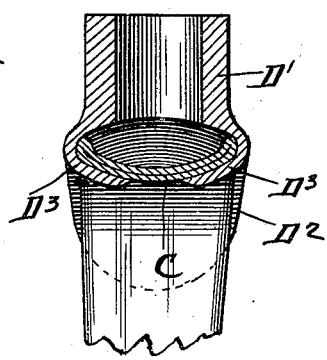
Fig. 4.
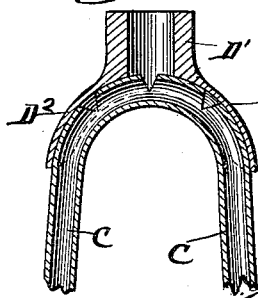
Fig. 8.
Fig. 7.
Witnesses
Jean Elliott
Julia Usler
Inventor:
Luther M. Cottle
By Burton and Burton
Attorneys
THE NORRIS PETERS CO., PHOTO-LITHO., WASHINGTON, D. C.

UNITED STATES PATENT OFFICE.

LUTHER M. COTTLE, OF CHICAGO, ILLINOIS, ASSIGNOR TO THE GORMULLY & JEFFERY MANUFACTURING COMPANY, OF SAME PLACE.

VELOCIPEDE.

SPECIFICATION forming part of Letters Patent No. 463,329, dated November 17, 1891.

Application filed February 28, 1891. Serial No. 383,237. (No model.)

*To all whom it may concern:*

Be it known that I, LUTHER M. COTTLE, a citizen of the United States, residing at Chicago, county of Cook, and State of Illinois, have invented certain new and useful Improvements in Velocipedes, which are fully set forth in the following specification, reference being had to the accompanying drawings, forming a part thereof.

This invention relates to improvements in the construction of velocipede-frames.

Figure 1 is a side elevation of a portion of a velocipede-frame embodying my improvements. Fig. 2 is an enlarged sectional detail of a joint in a frame of a velocipede which embodies one portion of my invention, section being made axially through the members which are united at such joint. Fig. 3 is a vertical section of the fork through the steering-axis in a plane transverse to the plane of the wheel. Fig. 4 is a section at the plane indicated by the line 4 4 on Fig. 3. Fig. 5 is a perspective of the forging used to re-enforce the fork at the bend and provide means for securing the steering-rod thereto. Fig. 6 is a perspective of one of the re-enforcing pieces used in forming the joint between the two members of the frame. Fig. 7 is an axial section of a part of the backbone split and trussed by the application of my invention. Fig. 8 is a section of a fork in the plane of the axes of the arms, showing a partial use of the invention, which is illustrated in Fig. 3.

In the drawings I have illustrated a portion of the frame of a velocipede, comprising the backbone and steering-head and steering-fork.

A is the backbone. B is the steering-head; C, the steering-fork. This construction affords an instance of a junction of a tubular member of the frame to another member—to wit, in this instance the backbone and steering-head. The structure of the joint herein shown between the backbone and steering-head is such as may be employed between any tubular member of frame which meets another member at an angle, and this part of my invention is not limited to the particular joint at the particular place herein shown.

The structure adopted and illustrated is such as to cause the tubular member in question to be joined to the other by a bracket-like termination of the tubular member, and this part of the invention consists in the mode of giving to such member such bracket-like termination, and consists in splitting the pipe which is to be thus joined to the other member longitudinally for a distance back from the end and bending the two portions of the split pipe away from each other, preferably and almost of necessity in practice in curves, each of said split portions being bent thus until the inner surface of each at the end is substantially tangent to the surface of the member to which the junction is to be made. In the instance illustrated, the other member of the frame being straight, the two split portions $A'$ $A^2$ are bent apart until their inner surfaces are tangent to the same line, being a vertical line in the surface of the member B, which constitutes the steering-head. The two portions might now be joined by welding directly to the steering-head, and a very rigid structure would result from this method without further improvement; but I prefer to re-enforce each of the severed portions by the re-enforcing pieces $a^{10}$ $a^{20}$, respectively. These re-enforcing pieces are formed from sheet metal and bent so that their edges respectively conform to the lines of the edges of the corresponding divisions $A'$ and $A^{10}$ of the pipe A, so that said re-enforcing pieces may be joined edge to edge with the said divisions $A'$ and $A^2$, respectively, and, being so joined by brazing the re-enforcing pieces in the positions indicated and shown in the drawings, each of said divisions of the tube A becomes itself tubular, though no longer circular in cross-section, but approximately oval or semicircular. Preferably the re-enforcing pieces are not only bent to correspond in curvature with the edges of the divisions $A'$ and $A^2$, as stated, but are also slightly curved transversely to adapt them more effectually to stiffen the said split divisions to which they are applied. Preferably, also, these re-enforcing pieces, instead of terminating at the line at which they would join the surface of the straight or undivided member B, are formed, as shown in Fig. 6, with the end bent down abruptly from the line of junction with the straight member, such end being concaved to fit the member B, and thereby affording increased surface for brazing to said straight member and increasing the security of the joint. The re-enforcing pieces are suitably matched to each other at their inner ends—that is, at the end of the slit which separates the parts A′ A². I prefer, also, to form these re-enforcing pieces with lateral flanges $a^{20}$, as illustrated, which project down within the split portions A′ and A² of the tube A to increase the surface for brazing, and thereby render the joint more secure. It will be observed that as thus formed the tubular frame A terminates in diverging tubular arms, which may be joined bracketwise to the other member B of the frame.

Another part of my invention relates to the fork, and it consists in making the two arms of the fork of one piece of flattened tube, which is folded at the middle point. In order to fold a tube in this manner and preserve its tubular form around the fold, it is obvious that the inner side at the point of bending must be compressed or shortened, and the outer side, following an arc of greater radius, must be stretched or parted to allow for the increase of length relatively to the inner side. It is practically impossible to fold iron or steel tubing of the size necessary to make a velocipede-fork around so short a curve as is necessary at the head of the fork and preserve the tubular form through said curve, because the metal will not stretch sufficiently on the outer side, and if the tube were ruptured transversely, instead of attempting to stretch it on the outer side, the strength of the metal would be partly lost, and thereby the benefit of the tubular structure will be partly lost. I overcome this difficulty practically by collapsing the tube at the portion which will form the bend, and preferably I do this without materially altering the transverse curvature of the side which will be the inner side of the bend; but instead I reverse the curvature of the side which is to be the outer side of the bend, so that it lies within the other side and may be in contact with it. By this means I reduce the difference between the radius of curvature of the inner and outer sides to the minimum—viz., to an amount equal to the thickness of the wall of the tubing. This makes it necessary to stretch the outer and contract the inner side of the bend very little in order to form the bend without rupturing the metal, so that when the bend is made the fork at that point has substantially all the strength of the tubing in its normal condition, and by reason of the fact that it has a transverse curvature—to wit, concave upward and convex downward—and also a longitudinal curvature—to wit, that which has been given it in forming the bend—it is very stiff—that is, it is much less inclined to straighten than a bend formed of two flat pieces of metal similarly folded but without the transverse curvature; but in order to further stiffen the fork at the bend I cap it with the forging-clip D. This forging, as first made with proper dies, comprises the upwardly-projecting circular boss D′, which affords means for securing the steering-rod rigidly to it, two lateral wings D² D², extending in opposite directions and curved downward from the boss, their curvature corresponding to the curvature of the bend of the fork, so that when such clip is applied on the top of the bend the said lateral wings fit over it and extend down upon the two side arms of the fork, respectively, as far as the collapsing or partial collapsing of the tube to form the bend has extended, so that the lower edges of said wings, which are suitably rounded, make contact with the surface of the two fork-arms. The clip has in addition to these lateral wings two similar lugs D³ D³ in front and behind, respectively, of suitable lengths to be folded under the bend of the fork and contact the under side of the bend after the clip is applied, so that when it has been thus placed in position it may be brazed to the fork, all the wings or lugs D² D³ being brazed onto the fork. It will be observed that the portion of the fork which forms the bend, taken with the clip which covers that portion, is now tubular, the inner wall of such tubular portion being the double wall of the original pipe forming the fork, which is now concave upward, and the outer or upper half of the wall of this tubular bend being formed by the overlying clip-wings D² and D². This forms a fork which is very stiff at the bend, and which may be very economically constructed and free from liability to part or break at this point because of its integral character, the two side arms of the fork being, as described, formed of one piece.

In some cases the bend in the fork may be sufficiently strong without collapsing the tube at the bend, but instead cutting it transversely at the outer side of the bend at points where the least loss of strength will be thereby caused and relying on the cap D with its wings to re-enforce and compensate for the lost strength. Such a construction is seen in Fig. 8.

The method of stiffening a tubular frame-bar, which is illustrated in the bracket-joint shown in Figs. 1 and 2, is applicable in situations which do not involve a junction with another piece, or, for example, in any other portion of the backbone A. In Fig. 7 I have shown a horizontal part A³ of the backbone trussed by splitting it for a portion of its length, the split part A³⁰ A³⁰ being split apart and re-enforced by the lining-pieces $a^{31}$ $a^{31}$, whereby they are rendered tubular, and the bar becomes thus a tubular truss.

I claim—

1. In a velocipede-frame, the rigid joint herein described between two members of the frame, consisting of a tubular member split back from the end and having the divided portions spread apart and the re-enforcing or lining pieces A¹⁰ A²⁰ joined to said split portions, respectively, to close them up from edge to edge, and the other member of the frame spanning the angle between the spread portions of the split member and joined to said split portions, respectively, substantially as set forth.

2. In a velocipede-frame, a tubular member thereof split longitudinally for a portion of its length and having the severed portions spreading apart in diverging curves and respectively combined with the re-enforcing pieces convex outward both transversely and longitudinally to render each of the said severed portions tubular and stiffly divergent, substantially as set forth.

3. In a velocipede, a wheel-fork having its two arms formed of one piece of tubing folded with a convex bend at the crest of the fork, combined with a clip or cap which covers said convex crest or bend and extends down onto the arms of the fork past their point of divergence and brazed thereto, substantially as set forth.

4. In a velocipede, a wheel-fork comprising a single piece of tubing folded to form both arms and having the outer wall of the tubing at the bend transversely convex toward the inner wall, whereby its transverse curvature is reversed at the bend, substantially as and for the purpose set forth.

5. In a velocipede, a wheel-fork comprising a single piece of tubing folded to form both arms of the fork and having the inner and outer walls of the tubing at the bend both transversely convex toward the other end of the fork, and a clip D, covering the bend and brazed to the folded pipe thereat, substantially as and for the purpose set forth.

6. In combination with the fork, the clip covering the bend thereof and having wings which extend laterally over the bend onto each arm, and lugs adapted to be folded toward each other under the bend, whereby the two arms of the fork are securely joined and stiffened in their relative positions, substantially as set forth.

7. In combination with the pipe folded to form both arms of the fork, the clip covering the bend between said arms and having wings which extend laterally over the bend onto each arm, and lugs adapted to be folded toward each other under the bend, substantially as and for the purpose set forth.

In testimony whereof I have hereunto set my hand, at Chicago, Illinois, in the presence of two witnesses, this 23d day of February, 1891.

LUTHER M. COTTLE.

Witnesses:
CHARLES S. BURTON,
JULIA USLER.